United States Patent
Yoo

(10) Patent No.: US 9,120,373 B2
(45) Date of Patent: Sep. 1, 2015

(54) ACTIVE AIR FLAP APPARATUS FOR VEHICLE

(75) Inventor: Gil Sang Yoo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 690 days.

(21) Appl. No.: 13/316,551

(22) Filed: Dec. 11, 2011

(65) Prior Publication Data

US 2013/0081785 A1    Apr. 4, 2013

(30) Foreign Application Priority Data

Sep. 30, 2011    (KR) .......................... 10-2011-0099609

(51) Int. Cl.
*F16K 17/38*    (2006.01)
*B60K 11/08*    (2006.01)

(52) U.S. Cl.
CPC ........... *B60K 11/085* (2013.01); *F01P 2031/00* (2013.01)

(58) Field of Classification Search
CPC .............................. F01P 20/31; B60K 11/085
USPC ........... 137/468, 527; 251/11; 236/35.2, 35.3; 135/99; 123/41.05, 41.06
See application file for complete search history.

(56) References Cited

U.S. PATENT DOCUMENTS

| | | | | |
|---|---|---|---|---|
| 4,284,235 A | * | 8/1981 | Diermayer et al. | 236/1 G |
| 4,979,672 A | * | 12/1990 | AbuJudom et al. | 236/68 B |
| 2010/0243352 A1 | * | 9/2010 | Watanabe et al. | 180/68.1 |

FOREIGN PATENT DOCUMENTS

| | | |
|---|---|---|
| JP | 2002-225573 A | 8/2002 |
| JP | 2003-170733 A | 6/2003 |
| KR | 1993-0012398 A | 7/1993 |
| KR | 1996-0000626 A | 1/1996 |
| KR | 1997-0065061 A | 10/1997 |
| KR | 10-2011-0022213 A | 3/2011 |

* cited by examiner

*Primary Examiner* — Kevin Lee
*Assistant Examiner* — P. Macade Nichols
(74) *Attorney, Agent, or Firm* — Morgan, Lewis & Bockius LLP

(57) ABSTRACT

An active air flap apparatus for a vehicle is configured to include an air flap 20, a thermoelectric device 40, a PCB 50, a heat transfer bar 60, and a variable length member 70. By the configuration, the air flap may be fixed by forcibly rotating the air flap so as to open the duct at the time of failure while reducing weight and cost, thereby preventing the vehicle from being damaged.

4 Claims, 5 Drawing Sheets

ACTIVE AIR FLAP APPARATUS FOR VEHICLE

CROSS-REFERENCE TO RELATED APPLICATION

The present application claims priority to Korean Patent Application No. 10-2011-0099609, filed on Sep. 30, 2011, the entire contents of which is incorporated herein for all purposes by this reference.

BACKGROUND OF THE INVENTION

1. Field of the Invention

The present invention relates to an active air flap apparatus for a vehicle, and more particularly, to an active air flap apparatus for a vehicle capable of forcibly opening the air flap at the time of failure while reducing weight and cost.

2. Description of Related Art

Generally, an engine room in a vehicle is provided with driving parts such as an engine, or the like, and various heat exchangers such as a radiator, an inter cooler, an evaporator, a condenser, or the like.

The above-mentioned heat exchangers mainly distribute a heat exchange medium therein and heat-exchange the heat exchange medium in the heat exchanger with air outside the heat exchanger to perform cooling or heat radiation. The outside air needs to be supplied smoothly into the engine room so that various heat exchangers in the engine room for the vehicle are stably operated.

However, when a vehicle is traveled at high speed, air resistance is greatly increased according to the introduction of a large amount of outside air at high speed, thereby reducing fuel efficiency of a vehicle.

To solve the problems, the active air flap apparatus has been developed to improve the fuel efficiency by making an open angle large at the time of low-speed traveling so as to increase the introduction of air into the engine room and an making the open angle small at the time of high-speed traveling so as to reduce the introduction of air thereinto.

As shown in FIG. 1, the active air flap apparatus according to the related art is configured to include a duct 1 fixedly mounted on a front end module (not shown) of a vehicle, a plurality of air flaps 3 rotatably coupled to the duct 1 through a linkage 2, an actuator 4 controlling an operation of the air flap 3 according to external conditions (engine temperature, cooling water temperature, or the like), and a sealing member 5 maintaining airtight between the front end module and the duct 1. In particular, the actuator 4 is configured to include a PCB 4a, a motor 4b, and a plurality of gear members 4c.

However, due to the actuator 4 including the motor 4b and the plurality of gear members 4c as described above, there are problems in that the active air flap apparatus according to the related art is heavy and expensive.

In particular, when the motor 4b is not driven due to the damage thereof, it is impossible to perform an operation of forcibly opening the air flap 3. Therefore, when the air flap 3 maintains the closed state and the vehicle is continuously traveled in the closed state, the engine temperature and the temperature of the heat exchangers are increased, thereby causing serious damages to the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an active air flap apparatus for a vehicle capable of preventing vehicle parts from being damaged due to an air flap, by taking a light and inexpensive configuration, in particular, a configuration capable of forcibly opening the air flap at the time of failure.

In an aspect of the present invention, an active air flap apparatus for a vehicle may include an air flap rotatably mounted on a duct through a linkage and including a loader coupled with the linkage, a thermoelectric device fixedly mounted on a housing that is mounted on the duct, a heat transfer bar mounted in the housing, wherein one end of the heat transfer bar is connected to the thermoelectric device to transfer heat at the time of operating the thermoelectric device, and a variable length member connected to the loader and the other end portion of the heat transfer bar and providing rotating force to the loader while changing a length of the variable length member according to a change in temperature of the heat transfer bar.

The apparatus may further include a PCB fixedly mounted on the duct to control an operation of the thermoelectric device.

The housing may include an outer housing fixedly mounted on the duct, and an inner housing fixedly mounted inside an end of the outer housing, the inner housing being mounted so as to fix the thermoelectric device and the one end of the variable length member therein and slidably receiving the heat transfer bar penetrating therethrough.

The variable length member is a spring made of a shape memory alloy by which a length of thereof is increased when temperature rises and a length thereof is recovered to an original length when temperature falls.

The outer housing is a heat insulation housing minimizing heat exchange with the outside. The outer housing spaced apart from an end of the heat transfer bar in a direction opposite to a direction in which the inner housing is positioned is fixedly mounted with a stumbling bar crossing an inner space of the outer housing in a direction orthogonal to a vertical direction of the outer housing, and one side of the outer housing is provided with a guide hole through which one end of the loader penetrates, the guide hole being extendedly formed along the vertical direction of the outer housing.

When the one end of the loader connected to the variable length member moves in a direction in which the length of the variable length member is increased to cross over the stumbling bar, the loader is restrained by the stumbling bar so that the loader does not move in a direction in which the length of the variable length member is reduced unless the loader is applied with external force.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
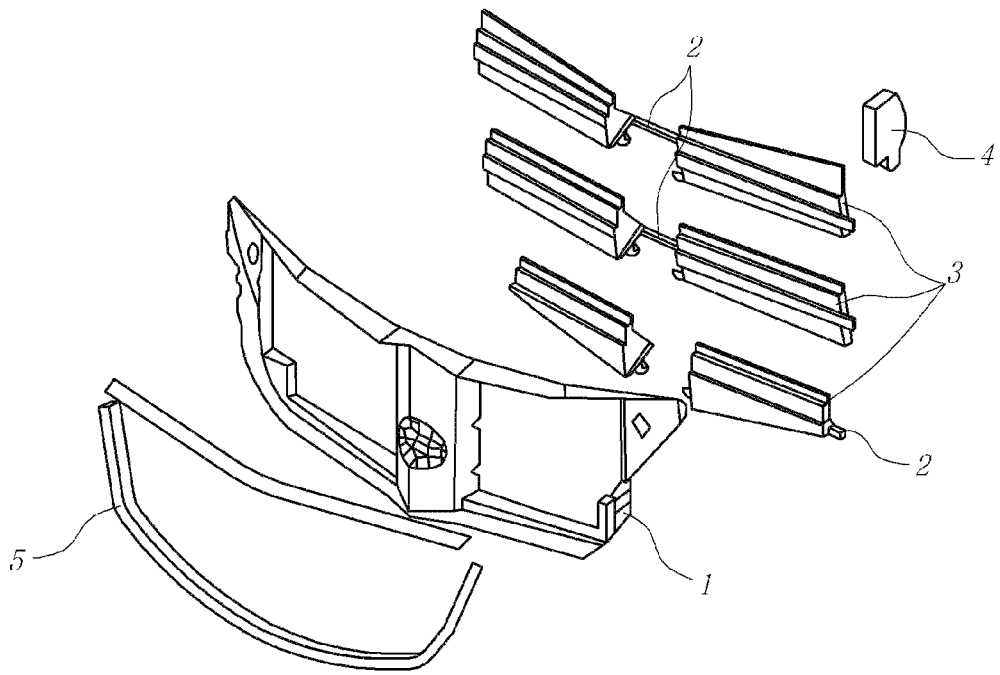
FIG. 1 is an exploded perspective view of an active air flap apparatus according to the related art.
Figure 2:
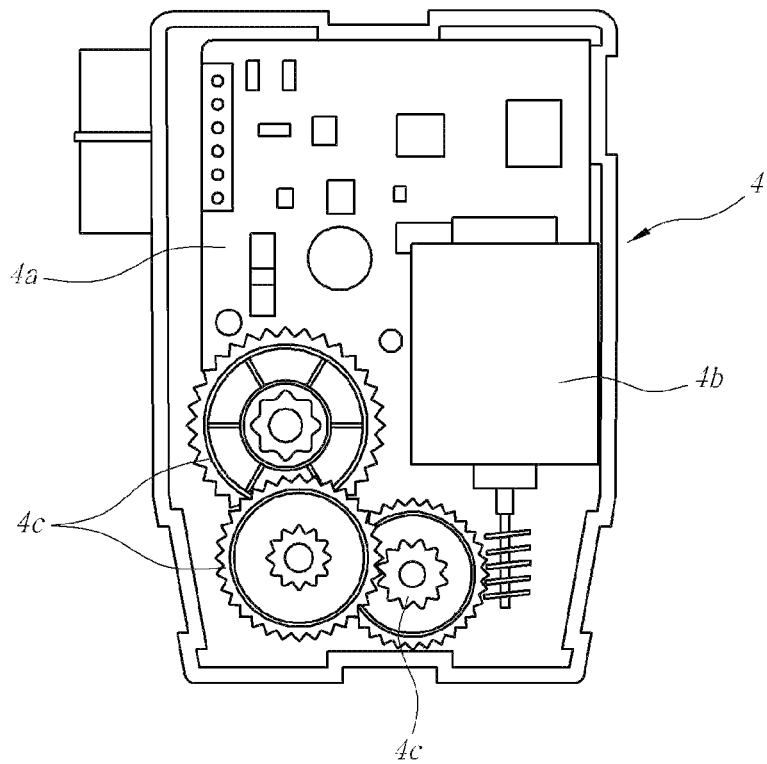
FIG. 2 is a diagram of an actuator used in the active air flap apparatus according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with preferred embodiments, it will be understood that the present description is not intended to limit the invention to those preferred embodiments. On the contrary, the invention is intended to cover not only the preferred embodiments, but also various alternatives, modifications, equivalents and other embodiments, which may be included within the spirit and scope of the invention as defined by the appended claims.

Hereinafter, an active air flap apparatus for a vehicle according to preferred embodiments of the present invention will be described with reference to the accompanying drawings.

As shown in FIGS. 3 to 9, an active air flap apparatus according to an exemplary embodiment of the present invention is configured to include a duct 10 fixedly mounted on a front end module of a vehicle, an air flap 20 rotatably mounted on the duct 10 through a linkage 21 and including a loader 22 coupled with the linkage 21, a thermoelectric device 40 fixedly mounted on a housing 30 that is mounted on the duct 10, a printed circuit board (PCB) 50 fixedly mounted on the duct 10 to control an operation of the thermoelectric device 40, a heat transfer bar 60 mounted in the housing 30 so that one end of the heat transfer bar 60 is connected to the thermoelectric device 40 to transfer heat at the time of operating the thermoelectric device 40, and a variable length member 70 mounted so as to connect to the loader 22 and the heat transfer bar 60 and providing rotating force to the loader 22 while changing a length of the variable length member according to a change in temperature of the heat transfer bar 60.

In this configuration, the PCB 50 is fixedly mounted on a central portion of a back surface of the duct 10 and two air flaps 20 are mounted below and above the left and right portions, respectively, based on the PCB 50 and thus, a total of four air flaps 20 are mounted.

However, the positions and number of air flaps 20 may be changed according to a model of the vehicle.

Figure 3:
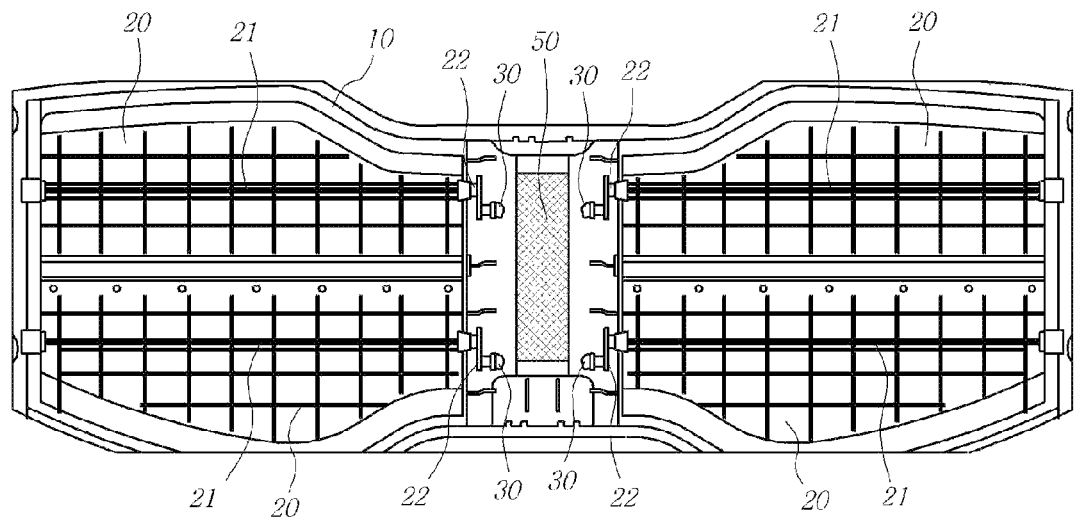
FIG. 3 is a diagram showing an active air flap apparatus according to an exemplary embodiment of the present invention, wherein it shows a state in which a duct is closed by the air flap is shown.
Figure 4:
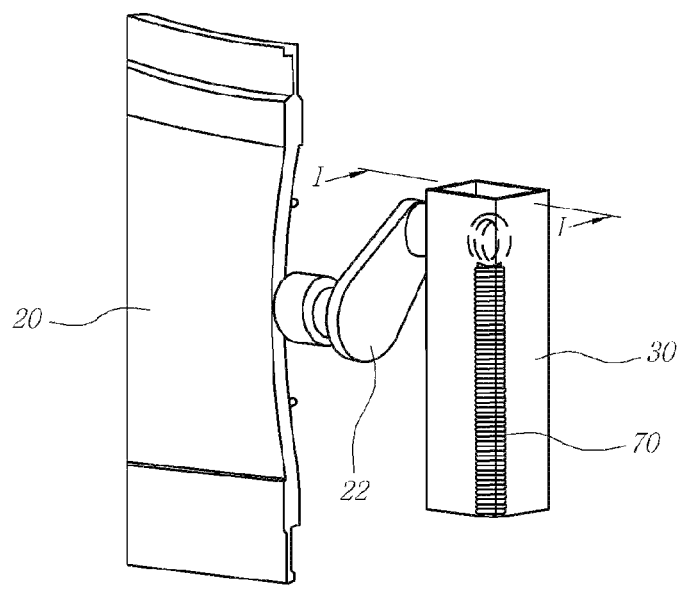
FIG. 4 is a diagram showing components of the active air flap apparatus according to an exemplary embodiment of the present invention.
Figure 8:
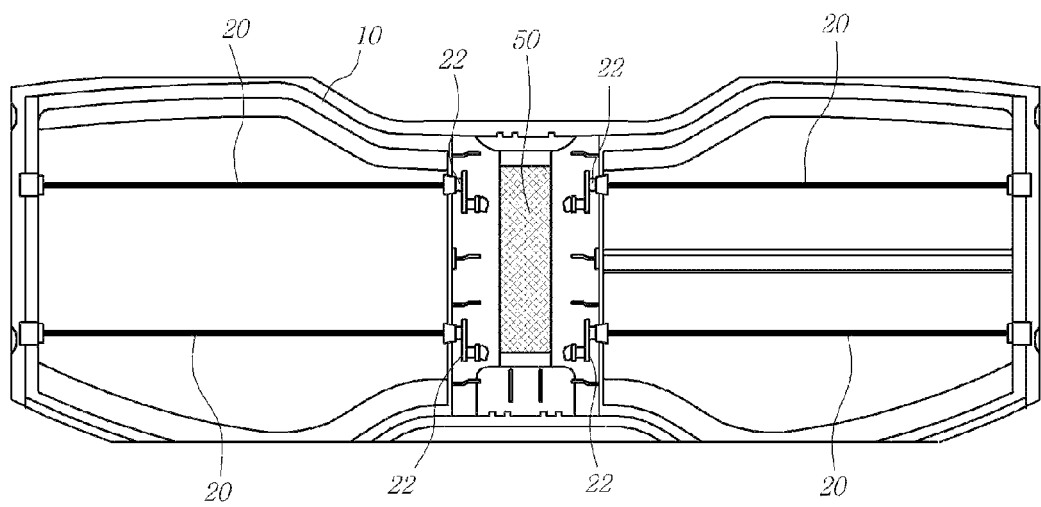
FIG. 8 is a diagram a state in which a duct is opened by the air flap.

As the air flap 20 rotates through the linkage 21, the duct 10 is in a closed state as shown in FIG. 3 or is in an opened state as shown in FIG. 8.

The housing 30 is configured to include an outer housing 31 fixedly mounted on the duct 10 and an inner housing 32 fixedly mounted inside an end of the outer housing 31, wherein the inner housing 32 is mounted so as to fix the thermoelectric device 40 and one end of the variable length member 70 and includes the heat transfer bar 60 penetrating therethrough.

Meanwhile, the variable length member 70 is a spring made of a shape memory alloy by which a length of thereof is increased when temperature rises and a length thereof is recovered to an original length when temperature falls.

In addition, the outer housing 31 is a heat insulation housing that may minimize heat exchange with the outside. As described above, if the outer housing 31 is used as a heat insulating housing, it is possible to prevent heat from being dispersed to the outside of the housing 30 when the heat transfer bar 60 transfers heat to the variable length member 70, thereby improving response (operating time) of the variable length member.

Further, the outer housing 31 is fixedly mounted with a stumbling bar 80 crossing an inner space of the outer housing 31 in a direction orthogonal to a vertical direction of the outer housing 31. The stumbling bar 80 is fixedly mounted at a position that is spaced apart from an end of the heat transfer bar 60 in a direction opposite to a direction in which the inner housing 32 is positioned.

In addition, one side of the outer housing 31 is provided with a guide hole 31a through which one end of the loader 22 penetrates, wherein the guide hole 31a is extendedly formed along the vertical direction of the outer housing 31.

The stumbling bar 80 and the guide hole 31a are components for forcibly rotating and fixing the air flap 20 so that the closed duct 10 is maintained in an opened state when the air flap 20 is not automatically operated.

The inner housing 32 prevents the heat transfer bar 60 from separating to the outside of the housing 30 due to an external impact.

The operation of the active air flap according to the exemplary embodiment of the present invention will be described below.

FIG. 3 shows a state in which the air flap 20 closes the duct 10.

When the PCB 50 receives signals, such as the rising of engine temperature, the rising of cooling water temperature in the state shown in FIG. 3, or the like, from external sensors, the PCB 50 transmits a control signal to operate the thermoelectric device 40. As a result, the thermoelectric device 40 generates heat.

The heat generated from the thermoelectric device 40 is transferred to the variable length member 70, that is, the spring made of the shape memory alloy through the heat transfer bar 60, wherein the variable length member 70 is modified so as to increase the length thereof with the gradual rising of temperature.

As described above, when the length of the variable length member 70 increases, the loader 22 connected to the variable length member 70 rotates and the duct 10 closed by the air flap 20 as shown in FIG. 3 is switched to the opened state as shown in FIG. 8 by rotating the linkage 21 and the air flap 20 together by the rotation of the loader 22.

Further, when the PCB 50 transmits the control signal by the change in external conditions to stop the operation of the thermoelectric device 40, the thermoelectric device 40 does not generate heat, the temperature of the heat transfer bar 60 gradually falls, and the length of the variable length member 70 is gradually reduced so as to be recovered to the original shape.

Accordingly, the loader 22 rotates in a direction opposite to a rotating direction when the length of the variable length member 70 is increased, such that the duct 10 opened by the rotation of the air flap 20 as shown in FIG. 8 is again switched to the closed state as shown in FIG. 3.

Meanwhile, when the active air flap according to the exemplary embodiment of the present invention is out of order in the closed state without being automatically operated as described above, the engine temperature and the temperature of other heat exchangers rise, thereby causing serious damages to a vehicle.

Figure 5:
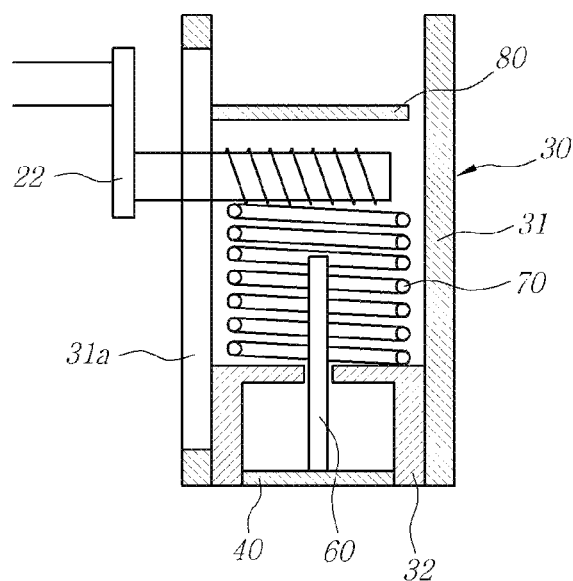
FIG. 5 is a cross-sectional view taken along the line I-I of FIG. 4.
Figure 6:
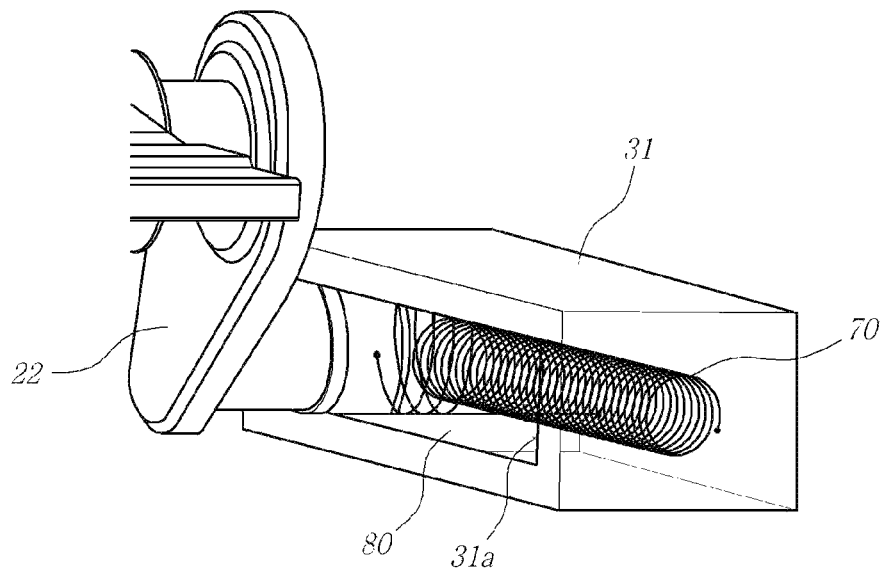
FIG. 6 is a diagram showing an inside of a housing.
Figure 7:
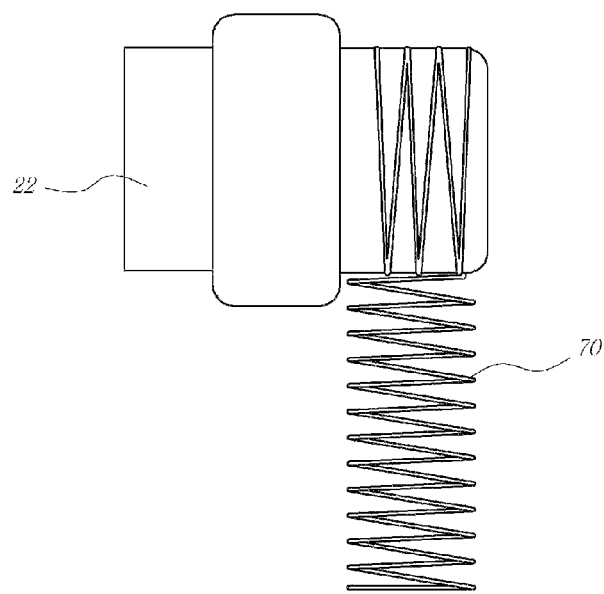
FIG. 7 is a diagram showing a coupling state of a loader and a variable length member.

Therefore, a vehicle needs to be safely maintained before repairing the active air flap. To this end, a worker holds the loader 22 in the state as shown in FIG. 5 and pulls the loader 22 in a direction opposite to the inner housing 32 to hang the loader to the stumbling bar 80.

The loader 22 smoothly moves along the guide hole 31a formed in the outer housing 31. When the loader 22 crosses over the stumbling bar 80 as shown in FIG. 9, the loader 22 is restrained by the stumbling bar 80 unless the loader 22 is applied with external force, such that the loader 22 does not again move in a direction in which the length of the variable length member 70 is reduced.

Figure 9:
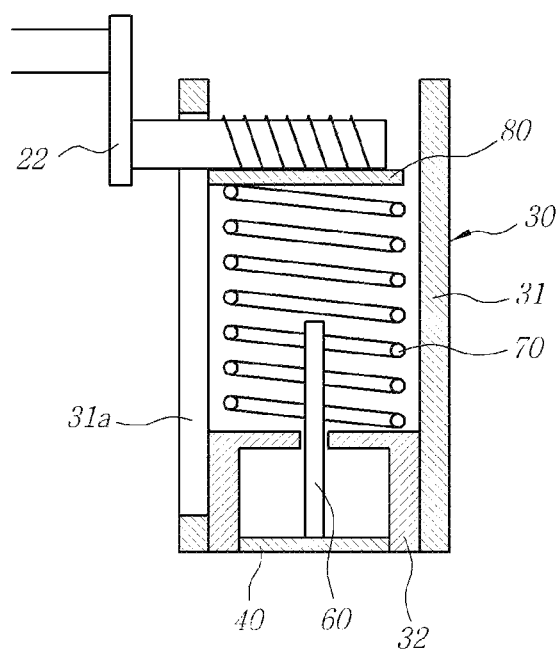
FIG. 9 is a diagram showing a position of a loader at the time of failure.

As shown in FIG. 9, when the loader 22 is restrained by being hung to the stumbling bar 80, the air flap 20 is in the forced rotation state, such that the closed duct 10 may continuously maintain the opened state as shown in FIG. 8. As a result, it is possible to prevent the vehicle from being damaged due to the failure of the air flap 20.

As described above, the active air flap apparatus according to the exemplary embodiment of the present invention can reduce weight and cost by not using the heavy and expensive motor and gear members.

In addition, the air flap 20 may be fixed by forcibly rotating the air flap 20 at the time of failure, thereby preventing the vehicle from being damaged due to the failure of the air flap 20.

The active air flap apparatus according to the preferred embodiments of the present invention can fix the air flap by forcibly rotating the air flap to so as to open the duct at the time of failure while reducing weight and cost, thereby preventing the vehicle from being damaged.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap apparatus for a vehicle, comprising:
   an air flap rotatably mounted on a duct through a linkage and including a loader coupled with the linkage;
   a thermoelectric device fixedly mounted on a housing that is mounted on the duct;
   a heat transfer bar mounted in the housing, wherein one end of the heat transfer bar is connected to the thermoelectric device to transfer heat at the time of operating the thermoelectric device; and
   a variable length member connected to the loader and the other end portion of the heat transfer bar and providing rotating force to the loader while changing a length of the variable length member according to a change in temperature of the heat transfer bar,
   wherein the housing includes:
      an outer housing fixedly mounted on the duct; and
      an inner housing fixedly mounted inside an end of the outer housing, the inner housing being mounted so as to fix the thermoelectric device and one end of the variable length member therein and slidably receiving the heat transfer bar penetrating therethrough,
   wherein the outer housing spaced apart from an end of the heat transfer bar in a direction opposite to a direction in which the inner housing is positioned is fixedly mounted with a stumbling bar crossing an inner space of the outer housing in a direction orthogonal to a vertical direction of the outer housing, and one side of the outer housing is provided with a guide hole through which one end of the loader penetrates, the guide hole being extendedly formed along the vertical direction of the outer housing, and
   wherein when the one end of the loader connected to the variable length member moves in a direction in which the length of the variable length member is increased to cross over the stumbling bar, the loader is restrained by the stumbling bar so that the loader does not move in a direction in which the length of the variable length member is reduced unless the loader is applied with external force.

2. The apparatus of claim 1, further comprising a PCB fixedly mounted on the duct to control an operation of the thermoelectric device.

3. The apparatus of claim 1, wherein the variable length member is a spring made of a shape memory alloy by which a length of thereof is increased when temperature rises and a length thereof is recovered to an original length when temperature falls.

4. The apparatus of claim 1, wherein the outer housing is a heat insulation housing minimizing heat exchange with the outside.

* * * * *